June 23, 1964  W. R. GLASSON ETAL  3,138,033
AUTOMATIC BELT TENSIONER FOR EXPANSIBLE V-PULLEY DRIVE
Filed Oct. 12, 1962

INVENTOR.
WOODROW R. GLASSON
and CARL VOSS
BY
Hood, Gust & Irish
Attorneys

United States Patent Office 3,138,033
Patented June 23, 1964

3,138,033
AUTOMATIC BELT TENSIONER FOR EXPANSIBLE V-PULLEY DRIVE
Woodrow R. Glasson and Carl Voss, Columbus, Ind., assignors to Reliance Electric and Engineering Company, Cleveland, Ohio, a corporation of Ohio
Filed Oct. 12, 1962, Ser. No. 230,122
7 Claims. (Cl. 74—230.17)

The present invention relates to an automatic belt tensioner for a speed-varying transmission of the expansible V-pulley type, and the primary object of the invention is to provide, in such a device, means for resiliently compensating for the theoretical variation in belt length which inevitably occurs during adjustment of such a transmission.

A further object of the invention is to provide, in such a device, a novel and resiliently-positioned mounting for the actuating levers, of such construction as to maintain substantial uniformity of belt tension during adjustment of such a transmission throughout at least the major portion of its speed range.

A still further object of the invention is to provide novel means for assisting the operator of such a transmission in adjusting the parts to provide an optimum belt tension.

Further objects of the invention will appear as the description proceeds.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

Figures 1, 2, 3:
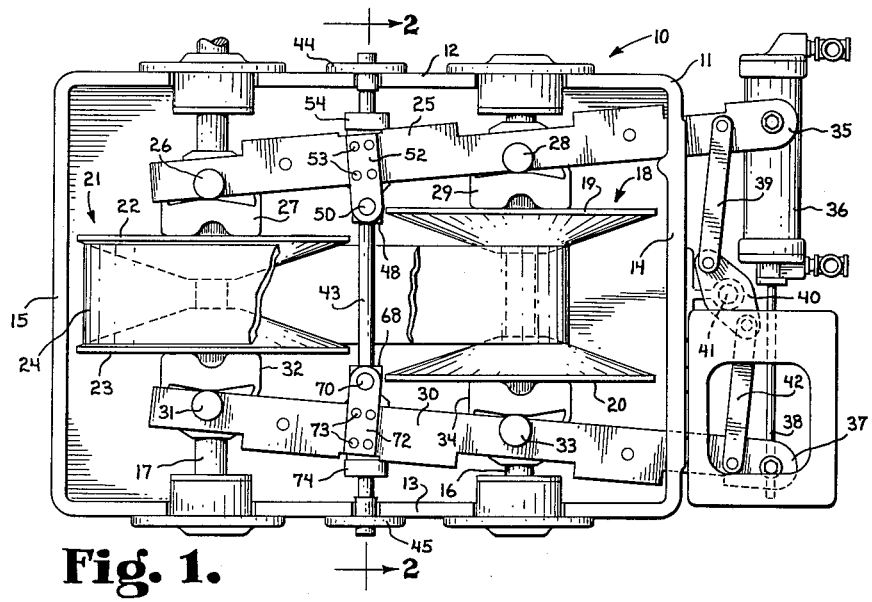
FIG. 1 is a plan view of a conventional speed varying transmission of the V-pulley type, in which our novel tension control means has been incorporated.
FIG. 2 is a transverse section, drawn to an enlarged scale, and taken substantially on the line 2—2 of FIG. 1.
FIG. 3 is a section, similar to the lefthand portion of FIG. 2, and showing a modified form of our invention.

Referring more particularly to the drawings, it will be seen that we have illustrated a variable speed transmission 10 of the so-called "Reeves" type. Such a transmission conventionally comprises a frame 11 consisting essentially of side walls 12 and 13 joined by end walls 14 and 15. An input shaft 16 and an output shaft 17 are journalled in suitable bearings supported in the side walls 12 and 13, upon spaced, transverse, parallel axes.

An expansible V-pulley, indicated generally by the reference numeral 18, is mounted on the input shaft 16 and comprises mating, coned discs 19 and 20 allochirally arranged for axial reciprocation upon said shaft with their coned surfaces in facing relation. A similar pulley, indicated generally by the reference numeral 21, comprises a similar pair of discs 22 and 23 similarly mounted upon the output shaft 17. An edge-active belt 24 is trained over the pulleys 18 and 21 to provide a driving connection therebetween.

A lever 25 carries, near one end, a roller 26 bearing against a thrust bearing 27 associated with the disc 22; and adjacent its opposite end, said lever carries another roller 28 similarly bearing against a thrust bearing 29 associated with the disc 19. Another lever 30 carries a roller 31 adjacent one end in cooperative engagement with a thrust bearing 32 associated with the disc 23; and adjacent its opposite end, the lever 30 carries a roller 33 similarly engaging a thrust bearing 34 associated with the disc 20. The lever 25 extends beyond the roller 28 and its end 35 is, in the illustrated embodiment of the mechanism, operatively connected to the cylinder 36 of a fluid motor, while the corresponding end 37 of the lever 30 is operatively connected to the piston rod 38 of said motor. A link 39 provides an operative connection between the lever end 35 and an equalizer element 40, supported upon a stationary pivot 41, and a link 42 similarly connects the lever end 37 with the opposite end of the element 40, whereby the lever ends 35 and 37 are constrained to equal and opposite movements under the influence of the motor 36, 38.

The structure as thus far described is conventional.

A screw shaft 43 is journalled in bearing elements 44 and 45 supported, respectively, from the side walls 12 and 13 of the frame 11, and is thereby held against axial movement. The shaft 43 is parallel with the input and output shafts 16 and 17 and is disposed with its axis intermediate the axes of said input and output shafts. Near one end, the screw shaft 43 is provided with a threaded section 46, and near its opposite end said screw shaft is provided with a threaded section 47, the threads at 46 and 47 being of opposite hands.

Slidably mounted on the screw shaft 43 near the threaded section 46 is a slide or block 48 formed with a transverse, threaded bore 49 therethrough; and pivot members 50 and 50' are threadedly received in the opposite ends of said bore. A bushing 51 is sleeved on the member 50 between the block 48 and the head of said member, and a bracket arm, preferably comprising a pair of identical elements 52, is supported upon said bushing for oscillation about the axis of the member 50, said axis being substantially perpendicular to the plane which is common to the axes of the input and output shafts 16 and 17. An intermediate portion of the lever 25 is sandwiched between the members 52 and is secured thereto by suitable fastening means such as, for instance, the rivets 53, whereby said lever is pivotally supported from the element 50.

In accordance with conventional practice, we have shown a lever 25' paralleling the lever 25 and coacting with the bearings 27 and 29 at points diametrically opposite the points of engagement of the lever 25 with said bearings. A bushing 51' mounted on the element 50' supports bracket elements 52' between which an intermediate portion of the lever 25' is secured, as by rivets 53', whereby the lever 25' is supported for coincident movement with the lever 25.

An abutment element 54 carries two or more symmetrically arranged slide pins 55 which are reciprocably received in guide bores 56 formed in the element 44; and said abutment element is threadedly mounted on the threaded section 46 of the screw shaft 43 at a point between the abutment element 48 and the adjacent frame wall 12. A guide yoke 57 is preferably sleeved on the screw shaft 43, and a coiled spring 58 is sleeved on said shaft and is confined between the abutment element 54 and said yoke. In effect, thus, the spring 58 is confined between the abutment member 54 and the slide 48 and acts to urge said slide toward the belt 24. Circumscribing the spring 58 is an axially-rigid sleeve 59 whose axial length somewhat exceeds the fully-collapsed length of the spring 58, for a reason which will appear.

Similarly, a slide block 68 is sleeved on the screw shaft 43 near the threaded section 47 and supports pivot elements 70 and 70'. A bushing 71 on the element 70 mounts bracket elements 72 for oscillation about the axis of the pivot element 70, and an intermediate portion of the lever 30 is sandwiched between said bracket plates 72 and secured thereto by rivets 73 or equivalent fastening means. In the same way, the lever 30' is secured by rivets 73' between bracket plates 72' supported from a bushing 71' for oscillation about the axis of the pivot element 70'. An abutment element 74 is threadedly mounted on the section 47 of the screw shaft and carries guide pins 75 reciprocably received in guide bores formed in the bearing element 45. A guide yoke 77 is interposed between the block 68 and the abutment member 74 and a coiled spring 78 is confined between said guide yoke 77 and said abutment member 74, a sleeve 79 like the sleeve 59 circumscribing said spring 78.

Thus, it will be seen that the lever 25 is mounted for oscillation about the pivot 50 while the lever 30 is mounted for oscillation about the pivot 70, said pivots being mounted for reciprocation upon the axis of the screw shaft 43 and being resiliently urged toward each other under a force which is adjustable in response to movement of the abutment elements 54 and 74 toward and away from each other. Since the abutment elements are threadedly mounted upon the oppositely-threaded sections 46 and 47 of the screw shaft 43, it will be apparent that rotation of said shaft in one direction will move the abutment elements 54 and 74 equally toward each other to increase the force exerted upon the slides 48 and 68 by the springs 58 and 78, while rotation of the screw shaft 43 in the opposite direction will move the abutment elements away from each other to reduce those forces.

It will be clear that, with the parts in the relative positions illustrated in FIG. 1, the shaft 17 will be driven from the shaft 16 by the belt 24 at a velocity less than that of the shaft 16. If the motor 36, 37 is actuated to move the lever ends 35 and 37 toward each other, the rollers 28 and 33 will press the discs 19 and 20 toward each other, while the rollers 26 and 31 will move away from each other to permit separation of the discs 22 and 23. As the discs 19 and 20 are forced toward each other, the belt 24 will be crowded radially outwardly over the coned faces of said discs and will thus be drawn more deeply between the coned faces of the discs 22 and 23, forcing said last-named discs away from each other. As the effective pitch diameter of the pulley 18 is thus increased and the effective pitch diameter of the pulley 21 is correspondingly decreased, the velocity of the shaft 17 will be increased. If the pivots 50 and 70 were stationary, this action would be accompanied by a change in the theoretical belt length; but, because the pivots 50 and 70 are mounted on the slides 48 and 68 which are resiliently urged toward each other along the axis of the screw shaft 43 by the springs 58 and 78, those pivots will move to compensate for the theoretical change, thus maintaining uniform belt tension throughout at least a major portion of the transmission adjustment range. In certain sizes of such transmissions, the rate of change of theoretical belt length is more pronounced near the extreme ends of the range, and the slides 48 and 68 will move to a significant degree; but the structure illustrated and described above responds even under those circumstances to overcome any tendency toward significant variations in belt tension.

The provision of the sleeves 59 and 79 constitutes an important feature of our present invention. Under given conditions of load and desired speed variation, any given size or design of transmission of the character here under consideration will operate at optimum efficiency only within a relatively narrow range of initial belt tension. Initial belt tension may be selected, in previously known transmissions of the type here under consideration, by adjustment of the lever pivots toward or away from each other, preferably at a time when the coned discs are set in median positions to provide a 1:1 ratio between the input and output shafts. Heretofore, the selection of that initial tension value has necessarily been a matter of guesswork or experimentation. According to the present invention, however, the length of the sleeves 59 and 79 may be so predetermined at the factory as to provide an invariable guide to the user of the transmission for setting the initial tension at optimum value. Thus, the user may be instructed to set the transmission at a 1:1 ratio, then to rotate the screw shaft 43 in a belt-tightening direction until the shaft cannot be turned farther. This, of course, will move the sleeves 59 and 79 into jammed engagement between the abutment 54 and the block 48 and between the abutment 74 and the block 68. The operator may be instructed then to turn the shaft 43 in a reverse direction through, for instance, one-half revolution, whereby the sleeves 59 and 79 will be backed away from the slides 48 and 68, respectively, to a predetermined degree; and it will be obvious that the lengths of the sleeves and the effective strengths of the springs 58 and 78 may be so preselected at the factory that, when the screw shaft is so operated, the resultant positions of the abutment elements 54 and 74 relative to the slides 48 and 68 will establish optimum belt tension conditions.

Because of this capacity, the optimum belt tension may be readily and promptly achieved upon initial installation of the transmission; and, when it becomes necessary to install a new belt or, for any other reason, to relax the belt tension temporarily, optimum tension conditions can again be easily and certainly achieved.

In FIG. 3, we have illustrated a modified form of the present invention. While we have shown, in FIG. 3, only one end of the screw shaft and the parts associated therewith, it will be understood that an equivalent assembly is associated with the opposite end of the shaft.

As shown in FIG. 3, a screw shaft 83 like the shaft 43 is supported in bearings, only one of which is shown at 84, and is provided at its opposite ends with oppositely threaded sections such as that illustrated at 85. In this form of the invention, the bearing 84 is provided with a plurality of sockets 86, symmetrically arranged about the axis of the screw shaft 83, and a guide rod 87, parallel with said shaft, is fixedly received in each such socket. A slide 88, similar to the slide 48, is sleeved on the shaft 83 and is provided with paraxial bores in which the distal ends of the guide rods 87 are guidingly and supportingly engaged.

The slide 88 is provided with oppositely-opening, threaded sockets 89 and 89' upon an axis perpendicular to the plane common to the axes of the input and output shafts 16 and 17; and pivot elements 90 and 90' are threadedly received in said bores to retain brackets 91 and 91' for oscillation about the axis of said pivots. Levers 92 and 92', equivalent in all respects to the levers 25 and 25', are suitably supported from said brackets 91 and 91' as, for instance, by rivets 93 and 93'.

An abutment element 94 is threadedly mounted on the section 85 of the screw shaft 83 and is perforated for sliding support upon the guide rods 87. A spring 95 is sleeved on each guide rod 87 and is confined between the slide 88 and the abutment 94. A sleeve 96 circumscribes the screw shaft 83 between the slide 88 and the abutment 94 and is so proportioned, with respect to said elements, that it will limit the minimum distance between the slide and the abutment to a dimension greater than the fully-collapsed lengths of the springs 95.

It will be apparent, of course, that the structure thus illustrated in FIG. 3 will operate precisely in the mode of operation of the structure illustrated in FIG. 2.

In case the transmission is subjected to a sudden overload or shock of sufficient magnitude to cause compression of the springs 58 and 78, the additional tension thereby transmitted to the belt will tend momentarily to carry the extra load and to prevent undue slippage. If the magnitude of the overload or shock is sufficient to move the yokes 57 and 77 actually into engagement with the sleeves 59 and 79, it will be clear that the tensioning device thereby becomes, in effect, a rigid assembly whereby the capacity of the transmission is increased. Of course, if the overload increases to an inordinate value, the belt will eventually slip, but it will be apparent that the device disclosed herein responds to such heavy shocks or overloads in a novel manner to

We claim as our invention:

1. In a speed-varying transmission of the type including an input shaft and an output shaft journalled on spaced, parallel axes, a pair of coned discs mounted on said input shaft for rotation and opposite axial reciprocation on the axis of said input shaft with their coned surfaces in facing relation, a pair of coned discs mounted on said output shaft for rotation and opposite axial reciprocation with their coned surfaces in facing relation, the first disc of one of said pairs and the first disc of the other of said pairs facing in a common direction and the second disc of said one pair and the second disc of said second pair facing commonly in the opposite direction, an edge-active belt trained over said disc pairs to provide a driving connection therebetween, a first lever mounted to swing in a plane parallel with the plane common to said shaft axes about a pivotal axis intermediate said shaft axes and having an operative connection with the first disc of each pair to urge either of said first discs toward its fellow, and a second lever mounted to swing in a plane parallel with the plane common to said shaft axes about a pivotal axis intermediate said shaft axes and having an operative connection with the second disc of each pair to urge either of said second discs toward its fellow; the invention which comprises mounting means for said pivotal axes including a screw shaft journalled on an axis between and substantially parallel with said shaft axes and extending oppositely beyond said belt, a one-piece block slidably mounted on said screw shaft at each side of said belt, each such block carrying one of said pivotal axes, abutment means for each such block, each such abutment means being threadedly mounted on said screw shaft and bodily spaced from its associated block at a point more remote from said belt than is its associated block, and spring means confined between each block and its associated abutment means to urge said blocks resiliently toward said belt, the threaded association of said abutment means respectively on said screw shaft being of opposite hand.

2. A variable speed transmission of the expansible V-pulley type comprising a frame, an input shaft and an output shaft journalled in said frame on spaced, parallel axes, an expansible V-pulley comprising a mating pair of coned discs mounted on said input shaft, an expansible V-pulley comprising a mating pair of coned discs mounted on said output shaft, an edge-active belt providing a driving connection between said pulleys, guide means carried by said frame on opposite sides of said belt upon a common axis parallel with and intermediate the axes of said input and output shafts, slide means reciprocably supported from each guide means, pivot means carried by each slide means upon an axis substantially perpendicular to the plane common to the axes of said input and output shafts, a lever supported intermediate its ends from each pivot means, each lever having an operative engagement adjacent one end with a disc of one pulley and adjacent its other end with a disc of the other pulley to exert force thereagainst to move such discs toward their respective fellows, means having an operative connection with corresponding ends of both levers to move said ends simultaneously toward or away from each other, and spring means for each slide means, abutment means for each spring means, said spring means yieldably urging said slide means toward each other, a screw shaft journalled in but axially fixed relative to said frame upon an axis parallel with and intermediate the axes of said input and output shafts, each of said abutment means being threadedly mounted on said screw shaft, the threadings by which said respective abutment means are so mounted being respectively of opposite hand, and means for positively limiting the minimum distance between each slide means and its associated abutment to a dimension greater than the fully collapsed dimension of the associated spring means measured in the direction of reciprocation of said slide means, said minimum distance being so selected, relative to the strength of said spring means, that, when said transmission is set to a 1:1 ratio and said screw shaft is rotated to bring said slide means to said minimum distance from their abutments, and then is rotated in the opposite direction to a predetermined degree, optimum belt tension will be automatically achieved.

3. A variable speed transmission of the expansible V-pulley type comprising a frame, an input shaft and an output shaft journalled in said frame on spaced, parallel axes, an expansible V-pulley comprising a mating pair of coned discs mounted on said input shaft, an expansible V-pulley comprising a mating pair of coned discs mounted on said output shaft, an edge-active belt providing a driving connection between said pulleys, a screw shaft journalled in but axially fixed relative to said frame upon an axis parallel with and located between said input and output shafts, slide means sleeved on said screw shaft for axial reciprocation relative thereto at each side of said belt, pivot means carried by each slide means upon an axis substantially perpendicular to the plane common to the axes of said input and output shafts, a lever supported intermediate its ends from each pivot means, each lever having an operative engagement adjacent one end with a disc of one pulley and adjacent its other end with a disc of the other pulley to exert force thereagainst to move such discs toward their respective fellows, means having an operative connection with corresponding ends of both levers to move said ends simultaneously toward or away from each other, spring means for each slide means, said spring means yieldably urging said slide means toward each other, abutment means for each spring means threadedly mounted on said screw shaft, the threadings by which said respective abutment means are so mounted being respectively of opposite hand, and means for positively limiting the minimum distance between each slide means and its associated abutment to a dimension greater than the fully collapsed dimension of the associated spring means measured in the direction of reciprocation of said slide means, such minimum distance being so selected, relative to the strength of said spring means, that, when said transmission is set to a 1:1 ratio and said screw shaft is rotated to bring said slide means to said minimum distance from their abutments, and then is rotated in the opposite direction to a predetermined degree, optimum belt tension will be automatically achieved.

4. The transmission of claim 3 in which each spring means is a coiled spring sleeved on said screw shaft and confined between its associated slide means and abutment means.

5. The transmission of claim 4 in which said distance-limiting means is an axially-rigid sleeve longer than the fully-collapsed length of said coiled spring, circumscribing each such spring and disposed between the associated slide means and abutment means.

6. A variable speed transmission of the expansible V-pulley type comprising a frame, an input shaft and an output shaft journalled in said frame on spaced, parallel axes, an expansible V-pulley comprising a mating pair of coned discs mounted on said input shaft, an expansible V-pulley comprising a mating pair of coned discs mounted on said output shaft, an edge-active belt providing a driving connection between said pulleys, a screw shaft journalled in but axially fixed relative to said frame upon an axis parallel with and located between said input and output shafts, a plurality of guide elements supported from said frame adjacent each end of said screw shaft, the guide elements of each plurality being parallel with and peripherally spaced from each other about the axis of said screw shaft, slide means mounted for axial reciprocation on each plurality of guide elements, pivot means carried by each slide means upon an axis substantially perpendicular to the plane common to the axes of said input and output shafts, a lever supported intermediate its ends from each pivot means, each lever having an operative engagement adjacent one end with a disc of one pulley and adjacent its other end with a disc of the other pulley to exert force thereagainst to move such discs toward their respective fellows, means having an operative connection with corresponding ends of both levers to move said ends simultaneously toward or away from each other, abutment means reciprocably guided on each plurality of guide elements adjacent each slide means but more remote from said belt than is its associated slide means, and a coiled spring sleeved on each of said guide elements and confined between the slide means and the abutment means associated with said guide element, each of said abutment means being threadedly engaged with said screw shaft, and the threadings of said respective abutment means being of opposite hand.

7. A variable speed transmission of the expansible V-pulley type comprising a frame, an input shaft and an output shaft journalled in said frame on spaced, parallel axes, an expansible V-pulley comprising a mating pair of coned discs mounted on said input shaft, an expansible V-pulley comprising a mating pair of coned discs mounted on said output shaft, an edge-active belt providing a driving connection between said pulleys, a screw shaft journalled in but axially fixed relative to said frame upon an axis parallel with and located between said input and output shafts, a plurality of guide elements supported from said frame adjacent each end of said screw shaft, the guide elements of each plurality being parallel with and peripherally spaced from each other about the axis of said screw shaft, slide means mounted for axial reciprocation on each plurality of guide elements, pivot means carried by each slide means upon an axis substantially perpendicular to the plane common to the axes of said input and output shafts, a lever supported intermediate its ends from each pivot means, each lever having an operative engagement adjacent one end with a disc of one pulley and adjacent its other end with a disc of the other pulley to exert force thereagainst to move such discs toward their respective fellows, means having an operative connection with corresponding ends of both levers to move said ends simultaneously toward or away from each other, abutment means reciprocably guided on each plurality of guide elements adjacent each slide means but more remote from said belt than is its associated slide means, a coiled spring sleeved on each of said guide elements and confined between the slide means and the abutment means associated with said guide element, each of said abutment means being threadedly engaged with said screw shaft, and the threadings of said respective abutment means being of opposite hand, and an axially-rigid sleeve circumscribing said screw shaft between each slide means and its associated abutment means, the axial length of said sleeves being so selected relative to the characteristics of said springs as to limit the minimum distance between said slide means and said abutment means to a dimension greater than the fully collapsed length of any one of the springs confined between said slide means and said abutment means and to establish a stop point from which rotation of said screw shaft to a predetermined degree while said transmission is set to a 1:1 ratio will automatically establish optimum belt tension.

References Cited in the file of this patent

UNITED STATES PATENTS

| 2,306,541 | Clay | Dec. 29, 1942 |
| 2,775,830 | Kenyon | Jan. 1, 1957 |

FOREIGN PATENTS

| 258,227 | Great Britain | Jan. 27, 1927 |